(12) United States Patent
Kong et al.

(10) Patent No.: US 12,341,553 B2
(45) Date of Patent: *Jun. 24, 2025

(54) SIGNAL TRANSMITTERS WITH SIZE-REDUCED ON-CHIP MEMORY

(71) Applicant: Apple Inc., Cupertino, CA (US)

(72) Inventors: Long Kong, Campbell, CA (US); Chia-Hsiang Chen, Sunnyvale, CA (US); Utku Seckin, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,959

(22) Filed: Nov. 2, 2023

(65) Prior Publication Data

US 2024/0137067 A1 Apr. 25, 2024
US 2024/0235607 A9 Jul. 11, 2024

Related U.S. Application Data

(63) Continuation of application No. 17/707,778, filed on Mar. 29, 2022, now Pat. No. 11,843,413.

(51) Int. Cl.
*H04B 1/7163* (2011.01)
*H04B 1/717* (2011.01)

(52) U.S. Cl.
CPC ....... *H04B 1/71635* (2013.01); *H04B 1/7172* (2013.01)

(58) Field of Classification Search
CPC .......... H04B 1/02; H04B 1/04; H04B 1/7163; H04B 1/71635; H04B 1/7172; H04B 1/7174

USPC ....... 375/135, 146, 295, 296; 455/91, 115.1, 455/115.2; 704/201, 220
See application file for complete search history.

(56) References Cited

U.S. PATENT DOCUMENTS

| | | | |
|---|---|---|---|
| 2004/0136438 A1 | 7/2004 | Fullerton | |
| 2014/0241239 A1 | 8/2014 | Chang | |
| 2021/0360450 A1* | 11/2021 | Kleinbeck | H04W 24/08 |
| 2021/0409083 A1 | 12/2021 | Kretsch et al. | |

FOREIGN PATENT DOCUMENTS

| | | |
|---|---|---|
| WO | 2006054148 | 5/2006 |
| WO | 2016190860 | 2/2016 |
| WO | 2018198453 | 11/2018 |

* cited by examiner

*Primary Examiner* — Young T. Tse
(74) *Attorney, Agent, or Firm* — Robert C. Kowert; Kowert, Hood, Munyon, Rankin & Goetzel, P.C.

(57) ABSTRACT

A signal transmitter may include a waveform synthesis circuit and a signal transmission circuit. The waveform synthesis circuit may store values of a reference waveform for a selected channel of the signal transmitter, and use the stored values to generate values of reference waveforms for one or more other channels of the signal transmitter. The waveform synthesis circuit may further include a sampling boost circuit to generate one or more additional values for the reference waveforms. The waveform transmission circuit may generate signals for the channels of the signal transmitter based at least in part on the values of the reference waveforms, and transmit the signals via one or more antennas.

20 Claims, 13 Drawing Sheets

SIGNAL TRANSMITTERS WITH SIZE-REDUCED ON-CHIP MEMORY

This application is a continuation of U.S. patent application Ser. No. 17/707,778, filed Mar. 29, 2022, which is hereby incorporated by reference herein in its entirety.

BACKGROUND

Technical Field

This disclosure relates generally to a signal transmitter, and more specifically to design of a signal transmitter to reduce size of on-chip memory on the signal transmitter.

DESCRIPTION OF THE RELATED ART

A signal transmitter, such as an ultra-wideband (UWB) signal transmitter, may include multiple channels for transmitting wireless signals. The wireless signals may be generated based on reference waveforms. Different channels may operate based on different reference waveforms, but the reference waveforms often have a similar shape. Typically, the signal transmitter may store values of the reference waveforms for each channel in on-chip memory of the signal transmitter, regardless of the similarity of the reference waveforms between different channels. When a signal transmitter has more channels, it can cause an increased requirement for size of the on-chip memory. As a result, this can cause an increase to the size, cost, and manufacturing complexity of the signal transmitter. Therefore, it is desirable to have a design for signal transmitters that can reduce the size requirement of the transmitter's on-chip memory.

DETAILED DESCRIPTION

Figure 1:
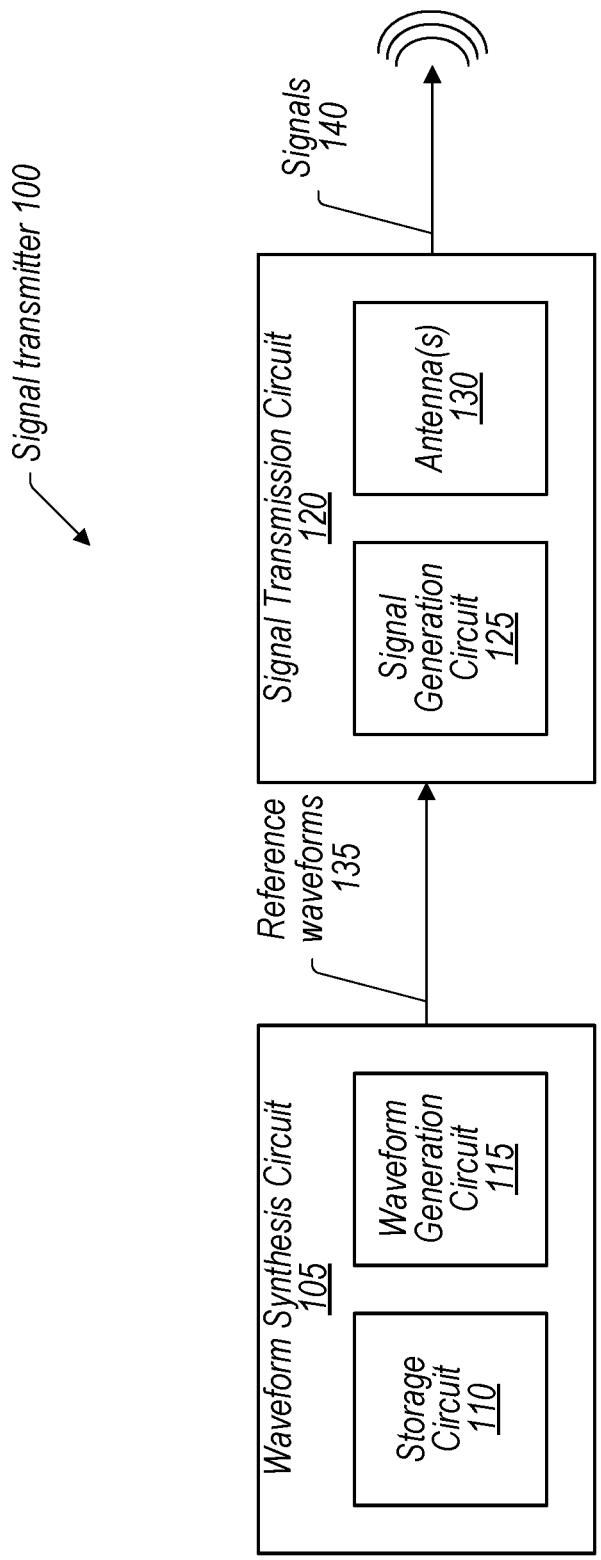
FIG. 1 shows an example signal transmitter, according to some embodiments.

Various embodiments described herein relate to a signal transmitter designed to allow size reduction of on-chip memory of the signal transmitter. In some embodiments, the signal transmitter may include a waveform synthesis circuit and a waveform transmission circuit to generate and transmit signals for multiple channels. The waveform synthesis circuit may generate reference waveforms for the different channels. The waveform transmission circuit may generate signals, based on the reference waveforms, for the different channels and transmit the signals, e.g., wireless signal via antennas. In some embodiments, the waveform synthesis circuit may include a storage circuit and a waveform generation circuit. The storage circuit may include one or more on-chip memory to store values of a reference waveform for a selected channel. The waveform generation circuit may use the values of the reference waveform that are stored in the storage circuit to generate reference waveforms for one or more other channels. In some embodiments, the waveform generation circuit may use interpolation of the stored values of the reference waveform to generate "new" waveforms, which may then be used to imitate the ideal reference waveforms of the other channels to generate signals.

In some embodiments, the waveform synthesis circuit may further include a waveform correction circuit. The waveform correction circuit may further correct the waveforms generated from the waveform generation circuit using one or more correction values. In some embodiments, the correction values may represent differences between the generated reference waveforms and their corresponding ideal reference waveforms. Thus, with the waveform correction, the reference waveform corrected by the waveform correction circuit (hereinafter "corrected reference waveforms") may imitate the ideal reference waveforms more precisely. In some embodiments, depending on the differences between the generated reference waveforms and ideal reference waveforms, the waveform correction may be needed only for certain values of the generated reference waveform and/or certain generated reference waveforms of certain channels. Thus, in some embodiments, to reduce computational overhead, the waveform synthesis circuit may further include a correction activation circuit, which may selectively activate or deactivate the waveform correction based at least in part on the differences between the generated reference waveforms and the corresponding ideal reference waveforms.

In some embodiments, the signal transmitter may include a sampling boost circuit. The sampling boost circuit may take a reference waveform from the waveform synthesis circuit as input, and generate one or more additional values for the reference waveform. As a result, this may effectively increase the sampling of the reference waveform, thus improving quality of the generated signal.

In some embodiments, the signal transmitter may be an ultra-wideband (UWB) signal transmitter operating according to relevant industrial standard(s), e.g., the IEEE 802.15.4 standard. For example, the signals transmitted from the signal transmitter may include wireless or radio signals in the format of pulses with a high bandwidth (e.g., close to or larger than 500 MHz) across a wide frequency range (e.g., from 3.1 GHz to 10.6 GHz). In some embodiments, the signal transmitter may be included as part of a mobile multipurpose devices, e.g., a smartphone, tablet, pad device, and/or other Internet of Things (IOT) devices. Moreover, in some embodiments, the signal transmitter may be used for various applications, e.g., distance estimation, object localization, wireless data transfer and communications, and/or other commercial or industrial use cases.

The signal transmitter disclosed herein provides at least several benefits. The signal transmitter may reduce the requirement for size of on-chip memory of the signal transmitter. For example, as described above, the signal transmitter may only need to store values of one reference waveform of a selected channel in the on-chip memory, and generate reference waveforms for the other channels on-the-fly during operation. This may greatly reduce the size of data needed to be stored in the on-chip memory ahead of time. Further, the signal transmitter may provide an increased sampling rate, e.g., using the sampling boost circuit, but without having to store the additional values (or samples) of a reference waveform in the on-chip memory in advance. As a result, the size reduction of the on-chip memory may also result in size reduction of the signal transmitter, which may cause reduction to size of the die, and cost and manufacturing complexity of the signal transmitter.

FIG. 1 shows an example signal transmitter, according to some embodiments. As shown in FIG. 1, in some embodiments, signal transmitter 100 may include waveform synthesis circuit 105 and signal transmission circuit 120. In some embodiments, signal transmitter 100 may include multiple channels. A channel may include a signal path from waveform synthesis circuit 105 to signal transmission circuit 120 of signal transmitter 100. For each channel, signal transmitter 100 may obtain a corresponding reference waveform (such as a corresponding reference waveform 135), e.g., using waveform synthesis circuit 105, and based at least in part on the reference waveform, generate (e.g., with modulation) and transmit a corresponding signal (such as a corresponding signal 140), e.g., using signal transmission circuit 120.

In some embodiments, waveform synthesis circuit 105 may include storage circuit 110 and waveform generation circuit 115. Storage circuit 110 may include one or more on-chip memory of signal transmitter 100. In some embodiments, storage circuit 110 may store values of a reference waveform for a selected one of the channels of signal transmitter 100. For example, for purposes of illustration, it is assumed that signal transmitter 100 may include five channels, and storage circuit 110 may store values of the reference waveform for channel no. 5. Note that the values of the reference waveform may correspond to respective points in time. Therefore, the stored values of the reference waveform may also be considered as sampled values of the reference waveform at those sampling points in time domain.

Waveform generation circuit 115 may use the values of the reference waveform stored in storage circuit 110 to generate reference waveforms for one or more other channels. Referring to the foregoing example, when storage circuit 110 stores values of the reference waveform for channel no. 5, waveform generation circuit 115 may use the stored values to generate reference waveforms for the other channels, e.g., channels no. 1-4. As further described below, in some embodiments, the generation of a reference waveform may be performed using interpolation of values of the stored reference waveform. For example, waveform generation circuit 115 may linearly interpolate two stored values to generate another value for another reference waveform.

When reference waveforms 135 for the different channels become available, signal transmission circuit 120 may take reference waveforms 135 as input to generate signals 140 and transmit signals 140 via one or more antennas 130. Various approaches may be used by signal transmission circuit 120 to generate signals 140 based at least in part on reference waveforms 135. For example, in some embodiments, given a reference waveform 135 for a channel (e.g., channel no. 2), signal transmission circuit 120 may use the reference waveform as a baseband signal and up-convert it to a center frequency by mixing the reference waveform 135 with a carrier signal to generate a corresponding signal 140. In other words, in this example, the reference waveform 135 may be considered as a modulation signal, which may be multiplied with the carrier signal, such as a sine or cosine waveform with a frequency equal to the center frequency that may be generated from an oscillator, to generate signal 140. Because signal 140 is the modulated signal of reference waveform 135, the spectral content of reference waveform 135 is thus incorporated in to signal 140. Note that the above is only one example for purposes of illustration, and various other modulation schemes may be applied by signal transmission circuit 120 to generate signals 140 based at least in part on reference waveforms 135. For example, the modulation schemes may include pulse amplitude modulation (PAM), on-off keying (OOK), pulse position or bit position modulation (PPM or BPM), phase shift keying (PSK), etc. In addition, the different channels of signal transmitter 100 may use modulation schemes independently from each other. For example, channel no. 1 may use the PAM to modulate a carrier signal with a first reference waveforms, whereas channel no. 2 may use the PSK to modulate the same or another carrier signal with a second reference waveform. Moreover, in some embodiments, the modulation may be performed in the digital domain. For example, the values of individual waveforms 135 may be considered as bitstreams to digitally represent the corresponding waveforms, and thus the above described up-conversion and modulation may be performed on the bitstreams to generate bitstreams for signals 140. As a result, waveform transmission circuit 120 may further include one or more digital-to-analog (D/A) circuits to convert the bitstreams from digital to analog to generate signals 140 as analog signals. When signals 140 are available, signal transmission circuit 120 may transmit signals 140 via one or more antennas 130. In some embodiments, antennas 130 may be shared by different channels of signal transmitter 100. Alternatively, in some embodiments, antennas 130 may be individually assigned to respective channels.

As described above, in some embodiments, signal transmitter 100 may be an ultra-wideband (UWB) signal transmitter. For example, signal transmitter 100 may operate according to relevant industrial standard(s), e.g., the IEEE 802.15.4 standard, where the reference waveforms 130 may be short pulses in nanoeconds or milliseconds with a high bandwidth (e.g., close to or larger than 500 MHz), and the channels of signal transmitter 100 may operate across a wide center frequency range (e.g., from 3.1 GHz to 10.6 GHz).

Figure 2:
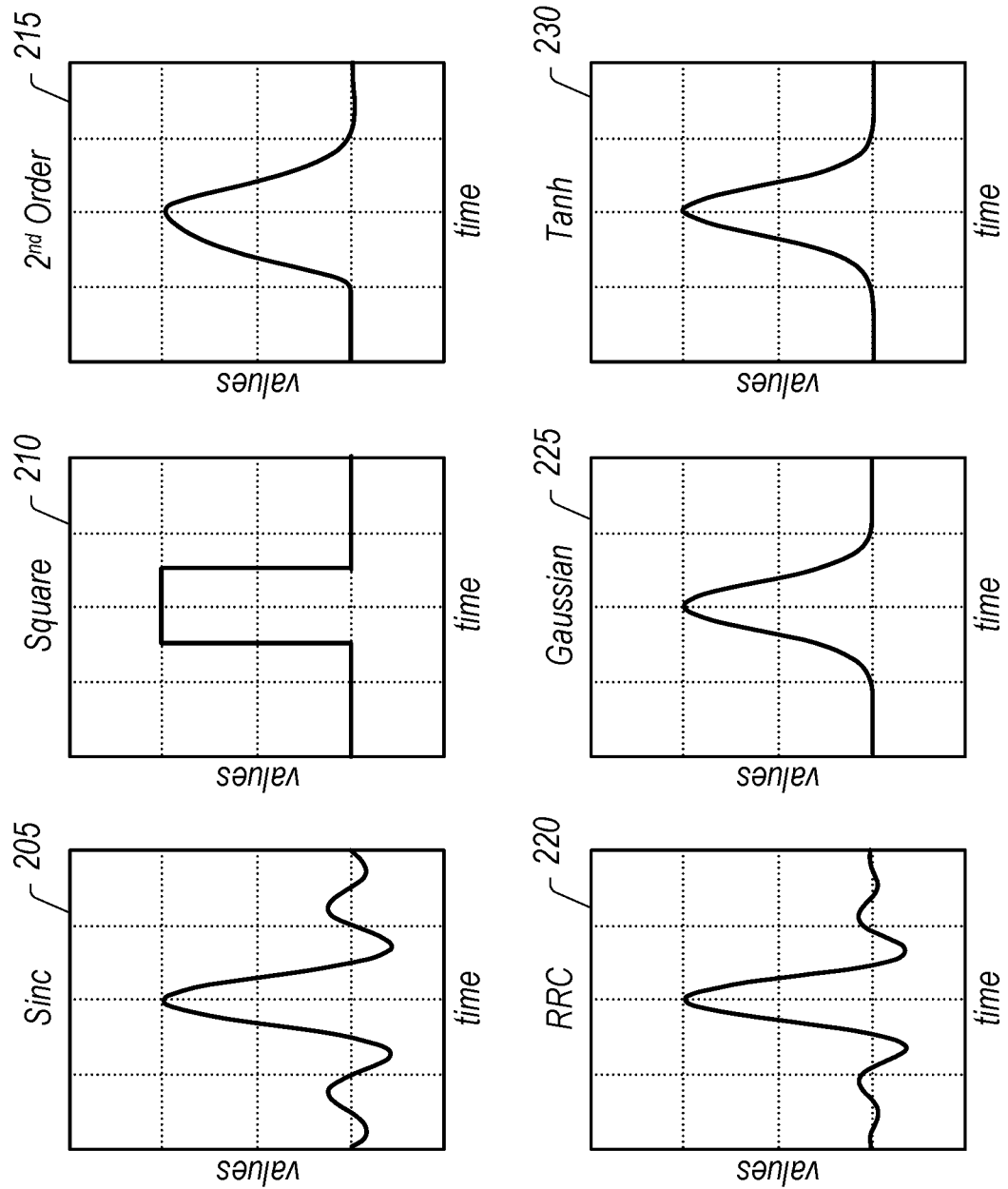
FIG. 2 illustrate example shapes for reference waveforms of a signal transmitter, according to some embodiments.

FIG. 2 illustrate example shapes for reference waveforms of a signal transmitter, according to some embodiments. In FIG. 2, the horizontal axes refer to time, and the vertical axes refer to values of the corresponding waveform. As illustrated here, in some embodiments, the shape of a reference waveform for a channel of a signal transmitter (e.g., signal transmitter 100) may include sine cardinal (or sinc) pulse 205, square pulse 210, $2^{nd}$ order filtered pulse 215, root-raised cosine (RRC) pulse 220, Gaussian pulse 225, hyperbolic tangent (or tanh) pulse 230, etc. In some embodiments, the signal transmitter may need reference waveforms of more than one shape to generate the signal for a channel. For example, the signal transmitter may use one reference waveform of a particular shape (e.g., sinc pulse 205) to indicate one operation, one operating mode, etc. (e.g., to start handshaking) as part of the signal transmitted for the channel, and another reference waveform of another shape (e.g., Gaussian pulse 225) to indicate another operation, operating mode, etc. (e.g., to begin data transfer) when the signal is transmitted. In some embodiments, the reference waveforms of different shapes may be assigned with respective labels or tags. Also, FIG. 2 illustrates the example reference waveforms for only a certain period of time, e.g., in a time window of a few nanoseconds or milliseconds. However, in some embodiments, the signal transmitter may use values of such reference waveforms repeatedly to continuously generate modulated signals (e.g., signals 140).

Figure 3:
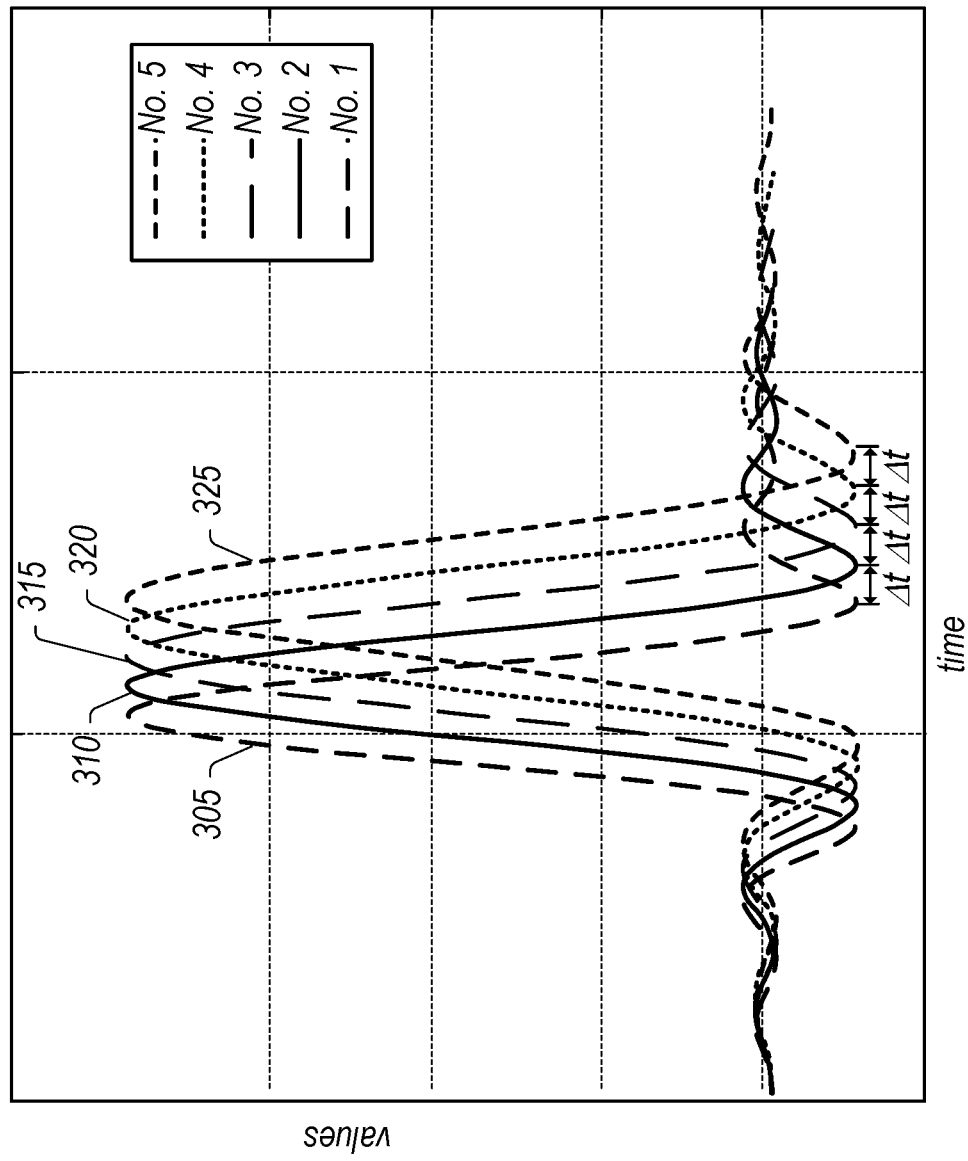
FIG. 3 shows example reference waveforms for different channels of a signal transmitter, according to some embodiments.

In some embodiments, the reference waveforms of different channels of a signal transmitter (e.g., signal transmitter 100) may be different from each other, but they may have a similar shape. Referring back to the foregoing example where the signal transmitter may include five channels, FIG. 3 shows example reference waveforms for the five channels no. 1-5, according to some embodiments. In FIG. 3, the horizontal axis refers to time, and the vertical axis refers to values of waveforms. Waveforms 305, 310, 315, 320, and 325 respectively represent the reference waveforms of channels no. 1-5 of the signal transmitter. As shown in FIG. 3, waveforms 305-325 may be different from each other, e.g., they may have different values at the same points in time, because the waveforms are for different channels and may intend to convey different messages. However, in some embodiments, waveforms 305-325 may all have the shape of a sinc pulse, but shift from each other by a time delay of Δt. Because waveforms 305-325 all have the same shape, almost all the values of one waveform may be found as well on another waveform (except at different points in time). For example, as shown in FIG. 3, waveform 310 includes a large positive peak value in the center of the waveform, together with some smaller positive peak values and some negative peak values in the decayed portion of the waveform. Almost all these peak values of waveform 310 may be also found in the waveform 325 except at different points in time, because the two waveforms have the same shape but are shifted from each other. Therefore, given a plurality of values of waveform 325, it may be possible to derive one or more other values of waveform 310 using the values of waveform 325. As described below, in some embodiments, the derivation may be performed based on interpolation.

To achieve channel and/or frequency diversity, in some embodiments, the different channels of signal transmitter 100 may operate at different center frequencies (e.g., using carrier signals of different frequencies). For example, in the foregoing example, channel no. 1-5 may respectively operate at a center frequency of 6.4892 GHz (or 13×499.2 MHz), 6.9888 GHz (or 14×499.2 MHz), 7.488 GHz (or 15×499.2 MHz), 7.9872 GHz (or 16×499.2 MHz), and 8.4864 GHz (or 17×499.2 MHz). The different frequencies may help to reduce interferences between different channels when their signals are transmitted around the same time. As described above, in signal transmitter 100, the values of a reference waveform may be considered samples of the reference waveform at individual points in time. Thus, to get a sufficient resolution and/or avoid aliasing or other signal processing related issues, the number of values (or the number of samples) of a reference waveform may vary according to the center frequency of the channel and bandwidth of the reference waveform. For example, given a reference waveform with a bandwidth of 499.2 MHz, when a channel operates at a center frequency of 6.4892 GHz, signal transmitter 100 may desire to have thirteen (e.g., 6.4892 GHz divided by 499.2 MHz) or more values (or samples) of the reference waveform. Accordingly, when the center frequency of the channel increases, the desired number of values may increase as well.

Figure 4:
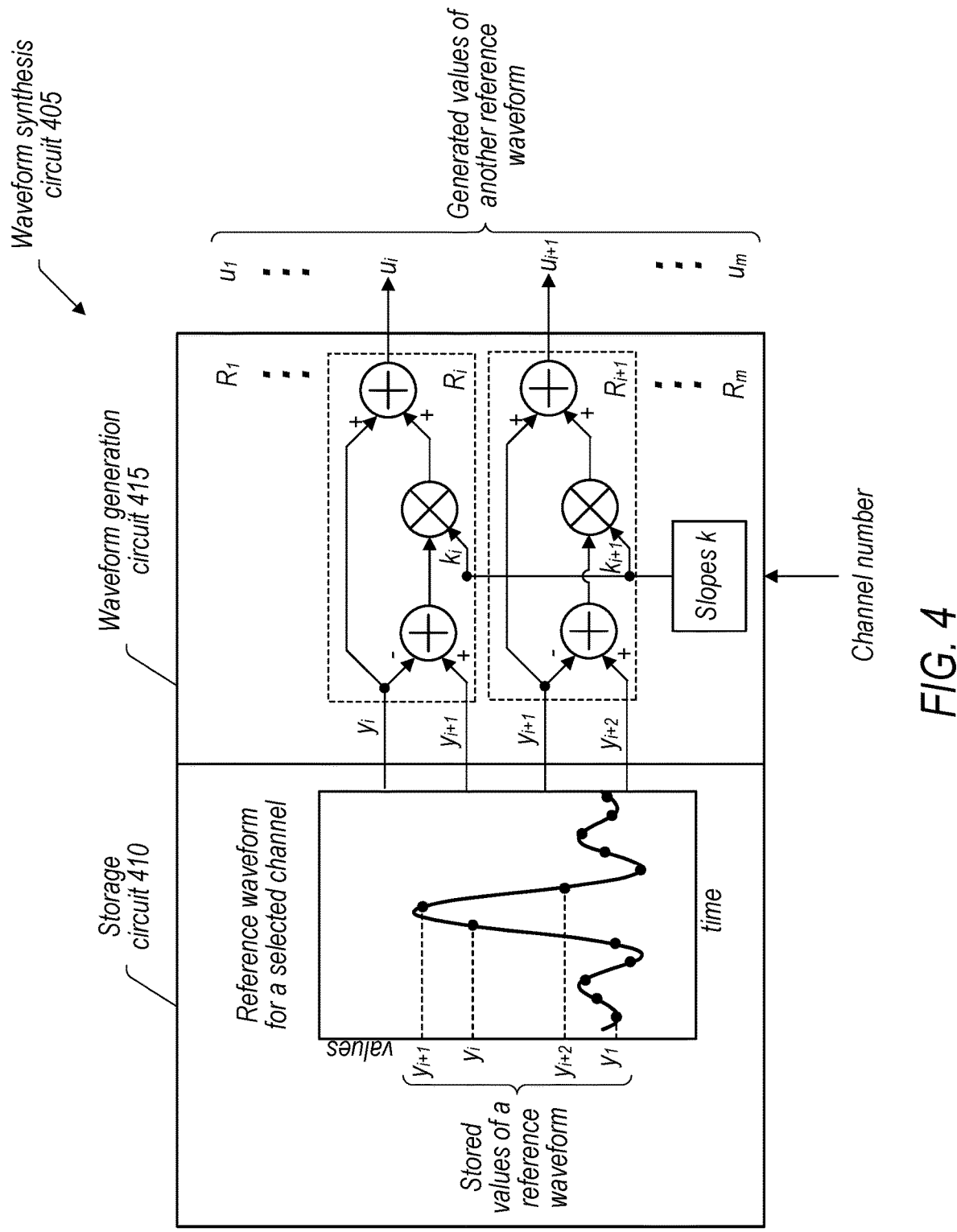
FIG. 4 shows an example waveform synthesis circuit of a signal transmitter, according to some embodiments.

FIG. 4 shows an example waveform synthesis circuit of a signal transmitter, according to some embodiments. In FIG. 4, similar to signal transmitter 100 described above, the signal transmitter may include waveform synthesis circuit 405, which may further include storage circuit 410 and waveform generation circuit 415. In some embodiments, storage circuit 410 may include one or more on-chip memory that stores a plurality of values (e.g., $y_1, \ldots, y_i, y_{i+1}, y_{i+2}, \ldots$) of a reference waveform for a selected channel of the signal transmitter. For purposes of illustration, in FIG. 4, the values (e.g., $y_1, \ldots, y_i, y_{i+1}, y_{i+2}, \ldots$) are shown to be distributed evenly in time domain. In other words, they may be considered values of the reference waveform sampled at evenly distributed points in time. In some embodiments, the sampling may not necessarily be performed at a fixed frequency, and the values may rather be distributed non-linearly in time domain.

In some embodiments, waveform generation circuit 415 may use interpolation of the stored values of the reference waveform to generate values for the other reference waveforms. For example, if the signal transmitter includes five channels, storage circuit 410 may store the values of the reference waveform for channel no. 5, and waveform generation circuit 415 may use the stored values to generate reference waveforms for channel no. 1-4. In some embodiments, the interpolation may be linear interpolation, where each individual value of a reference waveform may be generated based on two stored values. For purposes of illustration, the linear interpolation may be represented by equation (1):

$$u_i = k_i \times (y_{i+1} - y) + y_i \quad (1)$$

where $y_i$ and $y_{i+1}$ refer to two values of the reference waveform (e.g., of channel no. 5) that are stored in storage circuit 410, $k_i$ represents a corresponding slope for the interpolation, and $u_i$ is the corresponding value generated for a reference waveform of another channel (e.g., channel no. 2). As shown in FIG. 4, waveform generation circuit 415 may include multiple interpolators (e.g., $R_1, \ldots, R_i, R_{i+1}, \ldots R_m$) for generating the respective values (e.g., $u_1, \ldots, u_i, u_{i+1}, \ldots u_m$) of the reference waveform of the other channel (e.g., channel no. 2). The generated reference waveform may then be used as a mimic of the ideal reference waveform to generate the signal (e.g., signal 140) for this channel (e.g., channel no. 2). Note that the linear interpolation is provided only as an example for purposes of illustration. In some embodiments, values of a reference waveform may be also generated using non-linear interpolation, e.g., other higher-order polynomial interpolation, spline interpolation, etc. Moreover, in some embodiments, the generation of the values may not necessarily use interpolation but other waveform synthesis approaches.

In some embodiments, the values (e.g., $u_1, \ldots, u_i, u_{i+1}, \ldots u_m$) may be generated on-the-fly during operation of the signal transmitter. In other words, they may not necessarily be stored in storage circuit 410 ahead of time. Further, in some embodiments, the slope values may be determined ahead of time. For example, the slope values may be determined offline during design and/or manufacturing of the signal transmitter. Moreover, the signal transmitter may store one set of slope values for each channel for which a reference waveform is to be generated. In the foregoing example, the signal transmitter may store four sets of slope values, one set for one of the channels no. 1-4. In some embodiments, the slope values may be stored in storage circuit 410. During operation, waveform generation circuit 415 may obtain the number of a channel and then, according to the channel number, a corresponding set of slope values to generate values of the reference waveform for this channel. When the channel is the channel for which values are already stored in storage circuit 410 (e.g., channel no. 5 in the above example), the signal transmitter may bypass waveform generation circuit 415, or simply set the corresponding slope values k to plus one (or +1) in case linear interpolation is used in calculating reference waveforms. In some embodiments, compared to values of a reference waveform that need to be stored ahead of time for constructing the reference waveform, the correction values may be smaller. Therefore, even if the correction values are stored in storage circuit 510, they make take less storage space. For example, a value of a reference waveform may require an 8-bit memory space, whereas a slope value may only need a 3-bit memory space. Additionally, in the example illustrated in FIG. 4, waveform generation circuit 415 use the same interpolators (e.g., $R_1, \ldots, R_i, R_{i+1}, \ldots R_m$) to calculate values of reference waveform for different channels (e.g., channels no. 1-4). For example, waveform generation circuit 415 may generate values for one reference waveform first, and then proceed to generate values for a next reference waveform. This may be considered as a serial mode of operation. In some embodiments, waveform generation circuit 415 may generate values for reference waveforms in a parallel mode. For example, waveform generation circuit 415 may have dedicated interpolators for each channel (e.g., each one of channels no. 1-4), and then use the dedicated interpolators to generate the values of reference waveforms for respective channels.

In some embodiments, any one of the multiple channels of a signal transmitter may be selected as the selected channel for which the values of the reference waveforms may be stored, e.g., in a storage circuit of the signal transmitter. Alternatively, in some embodiments, a channel may be selected according to one or more factors. For example, as described above, in some embodiments, the desired number of values to digitally represent a reference waveform may vary according to the bandwidth of the reference waveform and the center frequency of the corresponding channel. In the foregoing example, among the five channels, channel no. 1 may operate at the lowest center frequency (e.g., 6.4892 GHz), whereas channel no. 5 may operate at the highest center frequency (e.g., 8.4864 GHz). Thus, channel no. 1 may desire the least number of values (or samples) to digitally represent its reference waveform, whereas channel no. 5 may desire the largest number of values (or samples) to digitally represent its reference waveform. Therefore, in some embodiments, channel no. 5 may be selected as the selected channel, because the largest number of values (or samples) may be available and used to generate more precise reference waveforms to imitate ideal reference waveforms of the other channels. Alternatively, in some embodiments, channel no. 1 may be selected as the selected channel, because the least number of values (or samples) may need to be stored in on-chip memory of the signal transmitter.

Figure 5:
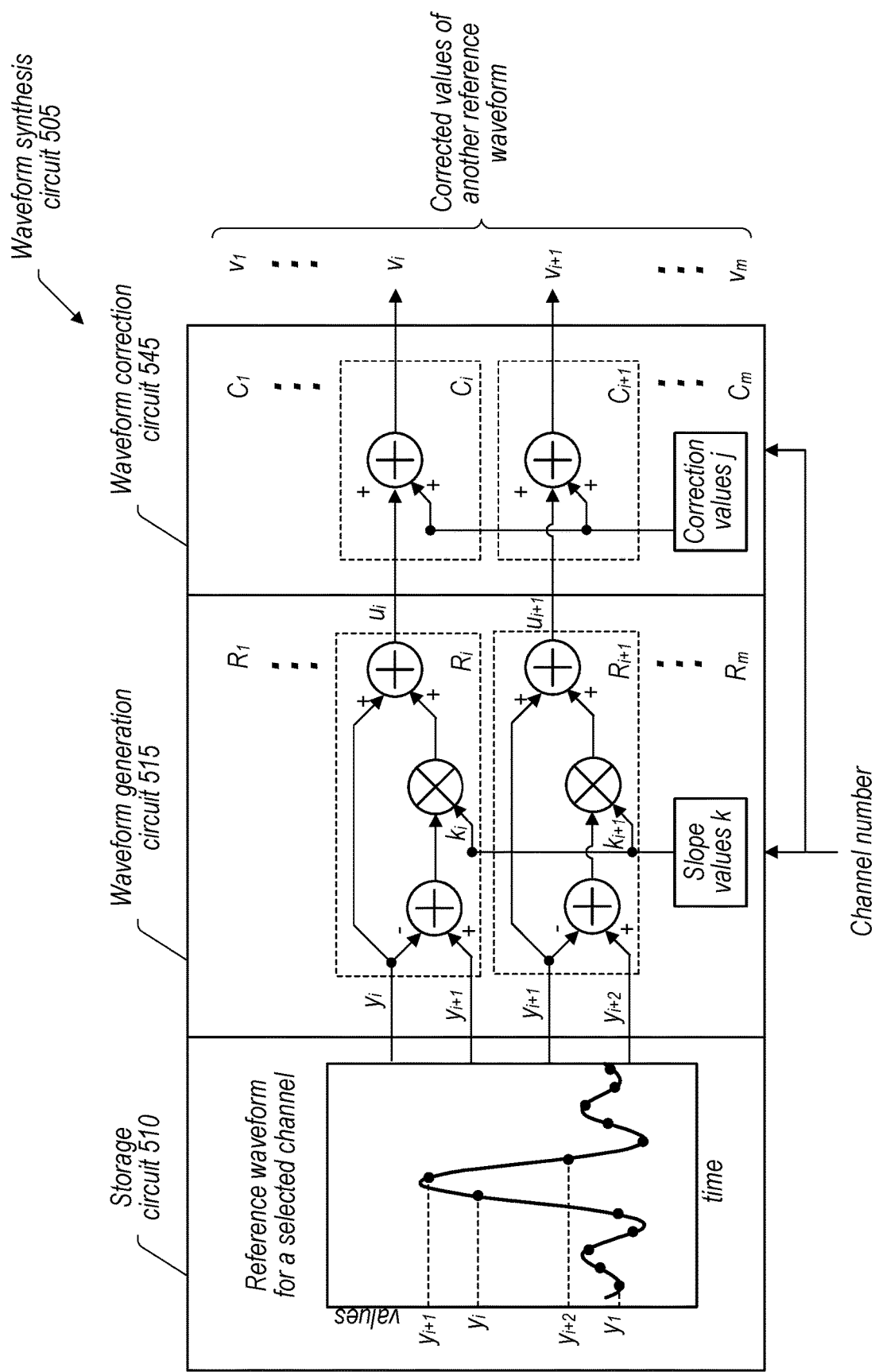
FIG. 5 shows another example waveform synthesis circuit of a signal transmitter, according to some embodiments.

In some embodiments, a signal transmitter may further include a waveform correction circuit to further correct the waveforms generated from the waveform generation circuit using one or more correction values. FIG. 5 shows another example waveform synthesis circuit of a signal transmitter, according to some embodiments. In some embodiments, the signal transmitter may include waveform synthesis circuit 505, which may further include storage circuit 510, waveform generation circuit 515, and waveform correction circuit 545. Similar to the waveform synthesis circuit described above in FIGS. 1-4, in some embodiments, storage circuit 510 may store values of a reference waveform for a selected channel of the signal transmitter, and waveform generation circuit 515 may generate, based at least in part on the stored values, values of reference waveforms for the other one or more channels of the signal transmitter. For example, storage circuit 510 may store a plurality of values (e.g., $y_1, \ldots, y_i, y_{i+1}, y_{i+2}, \ldots$) of the reference waveform of channel no. 5, and waveform generation circuit 515 may use the stored values (e.g., $y_1, \ldots, y_i, y_{i+1}, y_{i+2}, \ldots$) to generate one or more sets of values (e.g., one or more sets of $u_1, \ldots, u_i, u_{i+1}, \ldots u_m$) for respective reference waveforms of channels no. 1-4.

In some embodiments, a reference waveform generated from waveform generation circuit 515 may still include undesired errors compared to its corresponding ideal reference waveform. Therefore, in some embodiments, waveform synthesis circuit 505 may use waveform correction 545 to further correct the generated reference waveform to more precisely imitate its ideal reference waveform. In some embodiments, the correction of a generated reference waveform may be performed using one or more correction values (e.g., correction values j), where the correction values may represent differences between the generated reference waveform and its corresponding ideal reference waveform. For purposes of illustration, the waveform correction may be represented by equation (2):

$$v_i = u_i + j_i \quad (2)$$

where $u_i$ refers to a value of the reference waveform generated by waveform generation circuit 515, $j_i$ represents the corresponding correction value for value $u_i$, which may represent a difference between $u_i$ and a corresponding value (e.g., a value at the same point in time of $u_i$) of the ideal reference waveform, and $v_i$ refers to the corrected value. As shown in FIG. 5, waveform correction circuit 545 may include multiple correctors (e.g., $C_1, \ldots, C_i, C_{i+1}, \ldots C_m$) to generate the respective corrected values (e.g., $v_1, \ldots, v_i, v_{i+1}, \ldots v_m$) of the reference waveform of the other channel (e.g., channel no. 2). Since reference waveforms with the corrected values more precisely imitate the ideal reference waveforms, the signal transmitter may now use the reference waveforms with the corrected values (e.g., $v_1, \ldots, v_i, v_{i+1}, \ldots v_m$), instead of the reference waveforms with the uncorrected values (e.g., $u_1, \ldots, u_i, u_{i+1}, \ldots u_m$), to imitate the ideal reference waveforms to generate the signals for channels no. 1-4. Referring back to equation (1), the waveform generation and waveform correction at waveform synthesis circuit 505 may be represented by equation (3):

$$v_i = u_i + j_i = k_i \times (y_{i+1} - y_i) + y_i + j_i \quad (3)$$

Similar to what is described above with regards to the slope values, in some embodiments, the correction values j may be determined ahead of time and stored in storage circuit 410. During operation, waveform generation circuit 415 may obtain the number of a channel and then, according to the channel number, a corresponding set of correction values to correct values generated from waveform generation circuit 515 for this channel. When the channel is the channel for which values are already stored in storage circuit 510 (e.g., channel no. 5 in the above example), the signal transmitter may bypass waveform correction circuit 545 or simply set the corresponding correction values j to zero (or 0). Also, in some embodiments, compared to values of a reference waveform that need to be stored ahead of time for constructing the reference waveform, the correction values may be smaller. Therefore, even if the correction values are stored in storage circuit 510, they make take less storage space. Additionally, in the example illustrated in FIG. 5, waveform correction circuit 545 may use the same correctors (e.g., $C_1, \ldots, C_i, C_{i+1}, \ldots C_m$) for all channels (e.g., channels no. 1-4) in a serial mode. Alternatively, in some embodiments, waveform correction circuit 545 may include dedicated correctors to respective channels, and thus be able to correct reference waveforms for different channels in parallel.

In some embodiments, the differences between a reference waveform generated from a waveform generation circuit (e.g., waveform generation circuit 515) and its corresponding ideal reference waveform may not always be unacceptable. For example, a difference may be so small that it may be ignorant, or a distortion of a reference waveform may not be critical for certain applications. Thus, in some embodiments, a signal transmitter may further include a waveform correction activation circuit which may activate or deactivate the waveform correction for some values of a reference waveform or even an entire reference waveform for a channel, based at least in part on the differences between the generated reference waveform and its corresponding ideal reference waveform. The possibility to deactivate the waveform correction may avoid unnecessary calculation overhead, and thus further improve performance of the signal transmitter.

Figure 6:
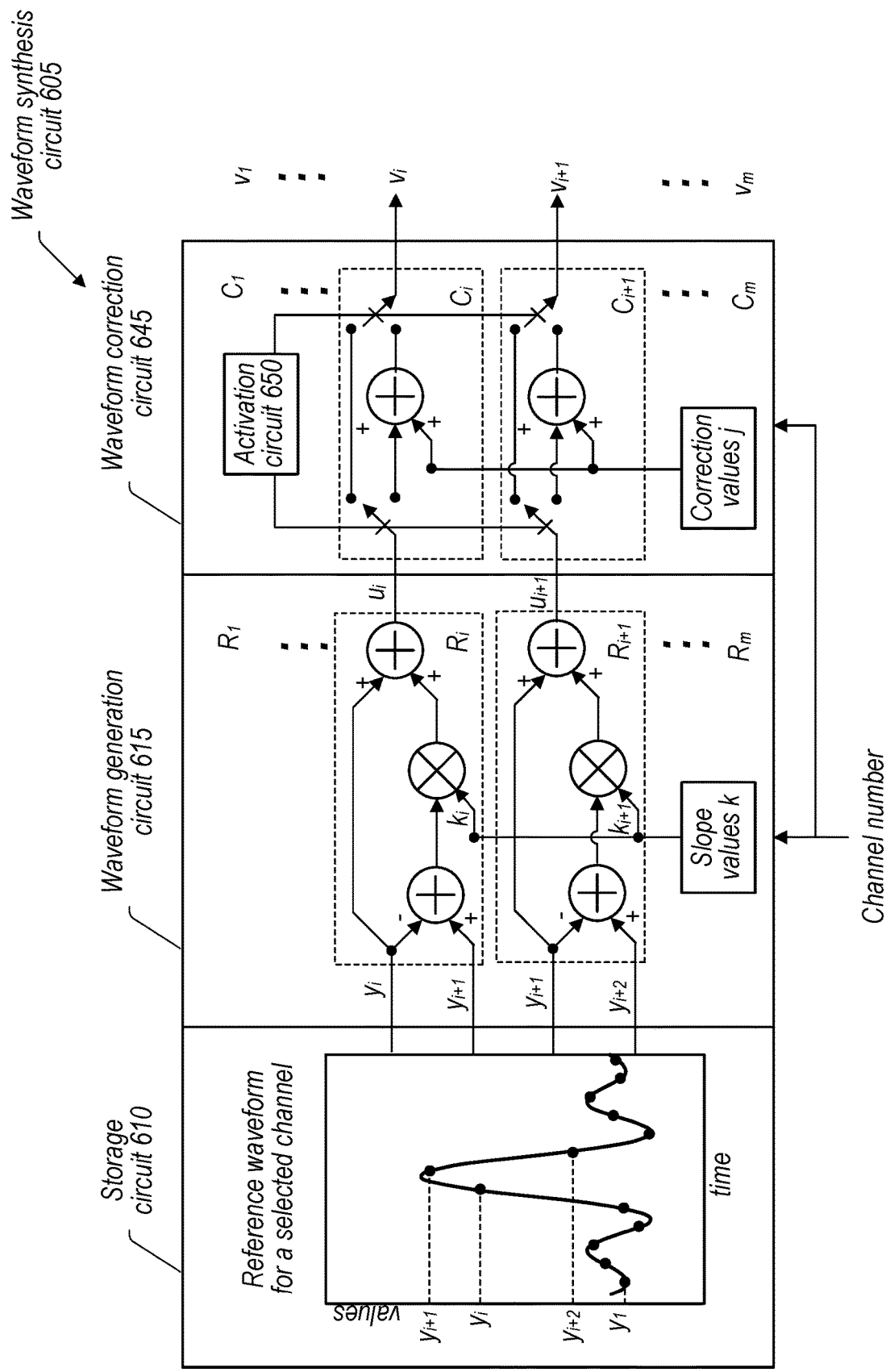
FIG. 6 shows still another example waveform synthesis circuit of a signal transmitter, according to some embodiments.

FIG. 6 shows still another example waveform synthesis circuit of a signal transmitter, according to some embodiments. In some embodiments, the signal transmitter may include waveform synthesis circuit 605 which may further include storage circuit 610, waveform generation circuit 615, waveform correction circuit 645, and waveform correction activation circuit 650. Similar to the waveform synthesis circuit described above in FIGS. 1-5, in some embodiments, storage circuit 610 may store values of a reference waveform for a selected channel of the signal transmitter. Waveform generation circuit 615 may generate, based at least in part on the stored values, values for reference waveforms of the other one or more channels of the signal transmitter. Waveform correction circuit 645 may further correct the values generated from waveform generation circuit 615 with one or more correction values.

In some embodiments, waveform synthesis circuit 605 may further include waveform correction activation circuit 650. Waveform correction activation circuit 650 may be implemented as part of waveform correction circuit 645 (as illustrated in FIG. 6), or alternatively a separate component from waveform correction circuit 645. In some embodiments, waveform correction activation circuit 650 may selectively active or deactivate the waveform correction for some values of a generated reference waveform from waveform generation circuit 615, and/or an entire reference waveform generated from waveform generation circuit 615. For example, as illustrated in FIG. 6, in this example, waveform correction circuit 645 may include a pair of switches respectively placed before and after the individual correctors (e.g., $C_1, \ldots, C_i, C_{i+1}, \ldots, C_m$). Therefore, for each value $u_i$ from waveform generation circuit 615, waveform correction activation circuit 650 may selectively toggle the switches to either correct $u_i$ with a corresponding correction value $j_i$ or bypass the waveform correction and send out $u_i$ directly. In some embodiments, the activation or deactivation may be determined based at least in part on the differences between a generated reference waveform and its corresponding ideal reference waveform. For example, when the difference between a generated value $u_i$ and its corresponding value (e.g., a value at the same point in time of $u_i$) of the ideal reference waveform is acceptably small, the signal transmitter may ignore the error and treat $u_i$ as the corresponding value of the ideal reference waveform. Note that FIG. 6 is provided only as an example for purposes of illustration. In some embodiments, the signal transmitter may not necessarily have the switches for individual correctors (e.g., $C_1, \ldots, C_i, C_{i+1}, \ldots, C_m$). Instead, the signal transmitter may only have the same switches for all values, so that the waveform correction may be activated or deactivated for the entire reference waveform. Note that in the example illustrated in FIG. 6, waveform correction activation circuit 650 and the switches may be shared between different channels. Alternatively, in some embodiments, the signal transmitter may include separate waveform correction activation circuit and/or separate switches assigned for different channels.

As described above, in some embodiments, it is desirable to have more values (or samples) of a reference waveform such that there is a sufficient resolution to represent the reference waveform by the individual values (or samples) in the digital domain. Therefore, in some embodiments, a signal transmitter may include a sampling boost circuit. The sampling boost circuit may take reference waveforms from the waveform synthesis circuit of the signal transmitter as input, and generate one or more additional values for those reference waveforms. This may effectively increase the sampling rate of the reference waveform, thus improving quality of the generated signal.

Figure 7:
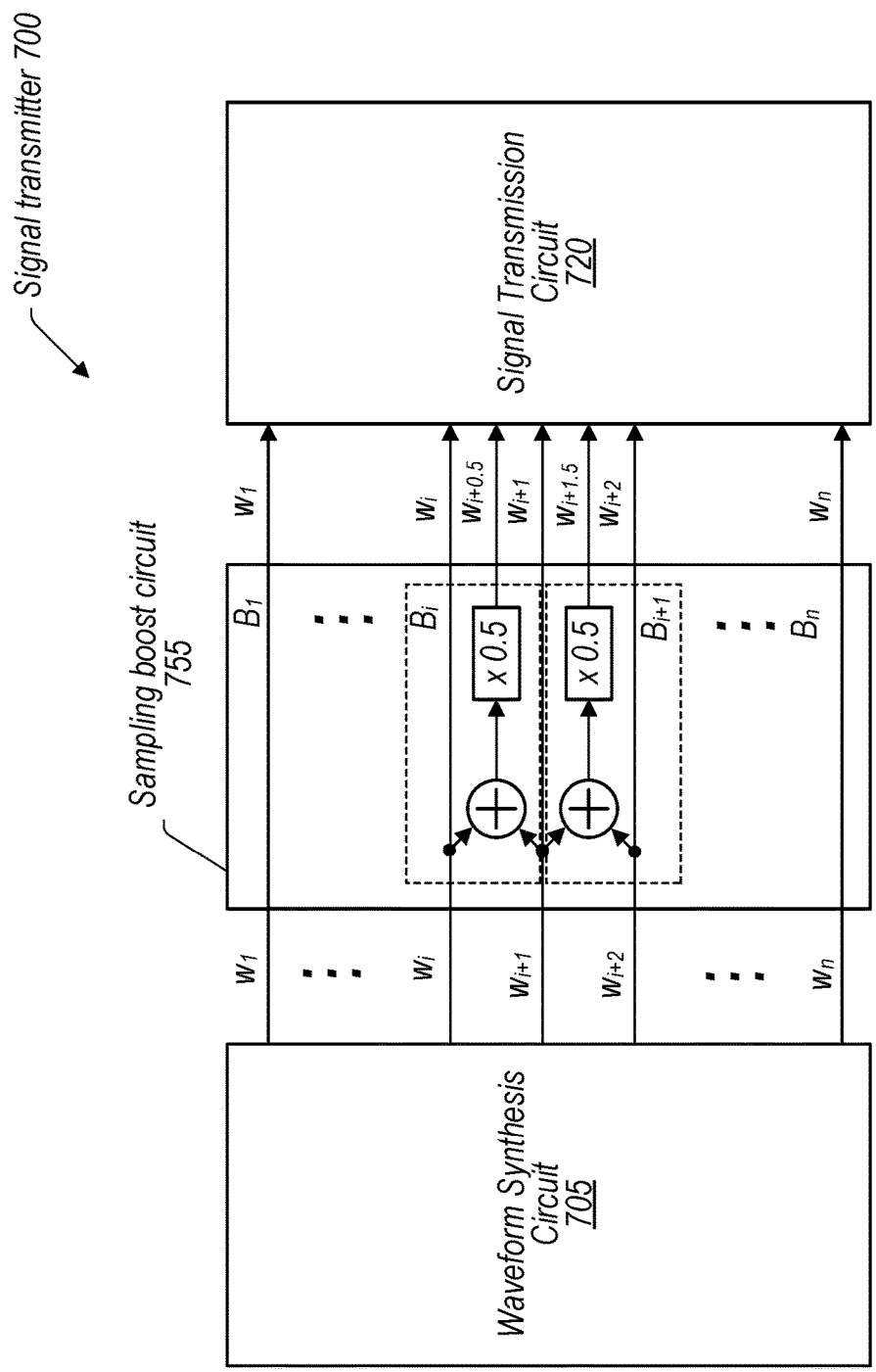
FIG. 7 shows an example signal transmitter including a sampling boost circuit, according to some embodiments.

FIG. 7 shows an example signal transmitter including a sampling boost circuit, according to some embodiments. In some embodiments, signal transmitter 700 may include waveform synthesis circuit 705, sampling boost circuit 755, and signal transmission circuit 720. Similar to the waveform synthesis circuit described above in FIGS. 1-6, waveform synthesis circuit 705 may provide values of the reference waveforms of the channels of signal transmitter 700. Among the values, the values of the reference waveform of a selected channel may be stored in a storage circuit of waveform synthesis circuit 705 ahead of time, and thus may be obtained and provided directly from the storage device. The values of the reference waveforms of the other channels may be generated by waveform synthesis circuit 705, based at least in part on the values of the stored reference waveform.

In some embodiments, sampling boost circuit 755 may take the values of the reference waveform synthesis circuit 705 as input, and generate one or more additional values for those reference waveforms. For example, assuming that signal transmitter includes five channels (e.g., channels no. 1-5), sampling boost circuit 755 may take the values (e.g., $w_1, \ldots, w_i, w_{i+1}, w_{i+2}, \ldots, w_n$) of the reference waveform for channel no. 2 as input, and calculate additional values (e.g., $w_{i+0.5}, w_{i+1.5}$, etc.) based at least in part on the values (e.g., $w_1, \ldots, w_i, w_{i+1}, w_{i+2}, \ldots, w_n$). As illustrated in FIG. 7, in some embodiments, the additional values may be generated using linear interpolation of the values from waveform synthesis circuit 705, as represented by equations (4)-(5):

$$w_{i+0.5}=(w_i+w_{i+1})\times 0.5 \quad (4)$$

$$w_{i+1.5}=(w_{i+1}+w_{i+2})\times 0.5 \quad (5)$$

where $w_i$, $w_{i+1}$, and $w_{i+2}$ refer to values from waveform synthesis circuit 705, and $w_{i+0.5}$, and $w_{i+1.5}$ represent additional values generated by sampling boost circuit 755.

In some embodiments, signal transmission circuit 720 may use the values (e.g., $w_1, \ldots, w_i, w_{i+1}, w_{i+2}, \ldots, w_n$) originally provided by waveform synthesis circuit 705, together with the additional values (e.g., $w_{i+0.5}$, $w_{i+1.5}$, etc.) generated by sampling boost circuit 755 to generate the signal for channel no. 2. Because the reference waveform of channel no. 2 is now represented by more values, this virtually increases the resolution and sampling rate of the reference waveform. Further, in some embodiments, sampling boost circuit 755 may generate the additional values on-the-fly during operation of signal transmitter 700. Thus, signal transmitter 700 may not have to store the additional values in the on-chip memory ahead of time. Note that the above sampling boosting may apply to not only reference waveforms generated by waveform synthesis circuit 705, but also the reference waveform originally stored in the storage device of waveform synthesis circuit 705. Also, FIG. 7 is provided only as an example for purposes of illustration. In some embodiments, signal transmitter 700 may not necessarily include both waveform synthesis circuit 705 and sampling boost circuit 755. For example, in some embodiments, signal transmitter 700 may store values of the reference waveforms for all channels in the storage circuit of signal transmitter 700. In that case, signal transmitter 700 may not have to include waveform synthesis circuit 705, or may only need a simplified waveform synthesis circuit, where the values (e.g., $w_1, \ldots, w_i, w_{i+1}, w_{i+2}, \ldots, w_n$) of the reference waveform for any channel may be obtained from the storage circuit rather than generated on-the-fly during operation of signal transmitter 700. Regardless of how the values of a reference waveform is obtained, once the values become available, as described above they may be taken by sampling boost circuit 755 as input to generate additional values. Moreover, in some embodiments, the generation of the additional values may be performed using other approaches, e.g., interpolation or non-interpolation techniques. For example, each one of the additional values may be determined based on three instead of two values. Moreover, in FIG. 7, sampling boost circuit 755 may be shared by different channels. In that case, sampling boost circuit 755 may operate serially, where it may first generate additional values for one reference waveform, and then process a next reference waveform. Alternatively, in some embodiments, signal transmitter 700 may have several sampling boost circuits respectively assigned to different channels that may operate in parallel.

Figure 8:
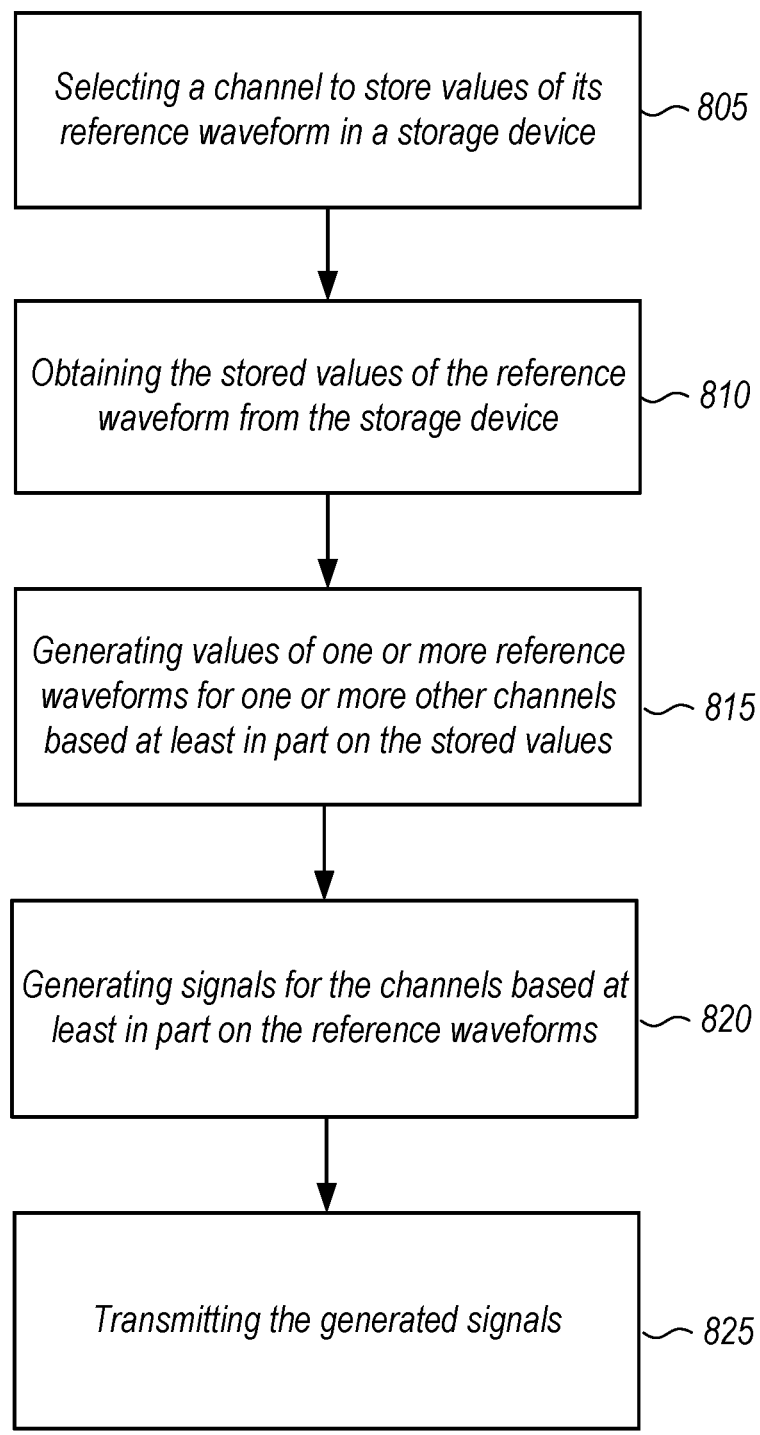
FIG. 8 is a flowchart illustrating example operations of a signal transmitter, according to some embodiments.

FIG. 8 is a flowchart illustrating example operations of a signal transmitter, according to some embodiments. As shown in FIG. 8, a signal transmitter (the signal transmitters described above in FIGS. 1-7) may include multiple channels, and may select one of the channels for which values of the reference waveform to be stored in a storage circuit of the signal transmitter (block 805). As described above, in some embodiments, any one of the channels may be selected as the selected channel for storing the reference waveform. Alternatively, in some embodiments, the channel may be selected according to one or more factors. For example, in some embodiments, a channel operating at the highest center frequency may be selected to provide the largest number of values to be used for generating other reference waveforms. In some embodiments, a channel operating at the least center frequency may be selected to store the least number of values in the storage circuit.

In some embodiments, values of the reference waveform of the selected channel may be stored in the storage circuit of the signal transmitter (block 810). In addition, as described above, the signal transmitter may also store other data, e.g., the slope values, correction values, etc., in the on-storage circuit.

In some embodiments, the signal transmitter may generate values of one or more references waveforms for one or more other channels, based at least in part on the stored values in the storage circuit (block 815). As described above, in some embodiments, the reference waveforms of the selected channel and the other channels of the signal transmitter may have a similar shape. For example, they may all in the shape of a sinc pulse, but shift from each other (as illustrated in FIG. 3). As a result, it may be possible to derive values of the other reference waveforms from values of the stored reference waveform. In addition, as described above, in some embodiments, the signal transmitter may generate values of the other reference waveforms using interpolation, e.g., linear interpolation, of values of the stored reference waveform.

In some embodiments, the signal transmitter may generate signals, e.g., analog signals, for the channels based on the reference waveforms (block 820). As described above, for example, for a given channel, the signal transmitter may use the reference waveform of the channel as a baseband signal and mix it with a carrier signal to generate a modulated signal, and then use one or more D/A circuits to generate an analog signal for the channel from the modulated signal. The signal transmitter may transmit the analog signals via one or more antennas (block 825)

Figure 9:
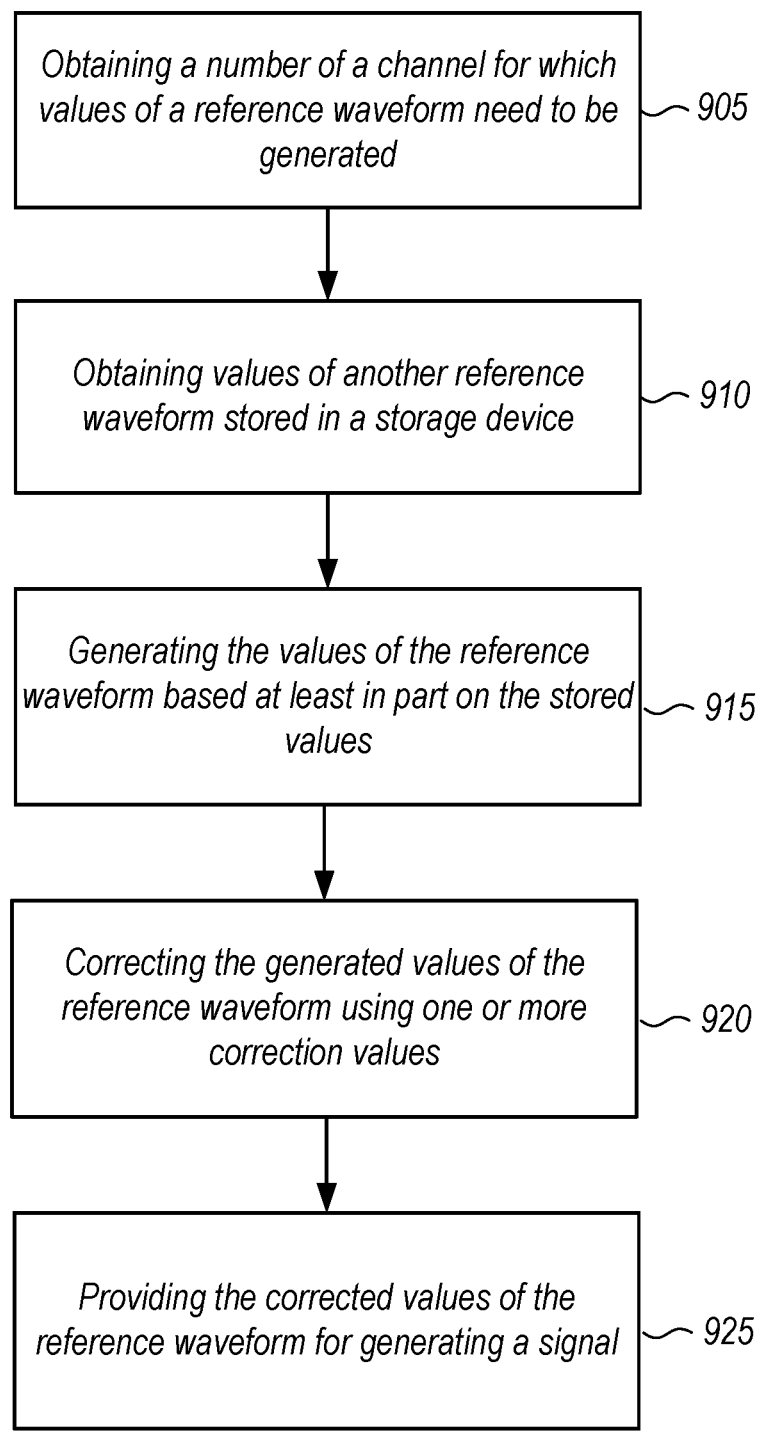
FIG. 9 is a flowchart illustrating example operations of a waveform synthesis circuit of a signal transmitter, according to some embodiments.

FIG. 9 is a flowchart illustrating example operations of a waveform synthesis circuit of a signal transmitter, according to some embodiments. As shown in FIG. 9, in some embodiments, a number of a channel may be obtained by the waveform synthesis circuit (e.g., the waveform synthesis circuits described above in FIGS. 1-8) of the signal transmitter, for which values of a reference waveform need to be generated (block 905).

In some embodiments, the waveform synthesis circuit may obtain values of another reference waveform from a storage device of the signal transmitter (block 910). For example, the signal transmitter may include five channels. Values of the reference waveform of channel no. 5 may be stored ahead of time in the storage circuit of the signal transmitter, and values of the reference waveforms of the other channels (e.g., channel no. 2) may need to be generated by the waveform synthesis circuit. Also, as described above, in some embodiments, the waveform synthesis circuit may further obtain other data, such as the slope values and/or correction values for the corresponding channel, from the storage circuit.

In some embodiments, the waveform synthesis circuit may generate the needed values of the reference waveform, based at least in part on the values of the reference waveform stored in the storage circuit (block 915). For example, as described above with regards to equation (1), the values may be generated using interpolation, e.g., linear interpolation, of the stored values.

In some embodiments, as described above with regards to equations (2)-(3), the waveform synthesis circuit may further correct the generated values using one or more correction values (block 920). In some embodiments, the correction values may represent differences between the generated values of a reference waveform (that are used to imitate values of a corresponding ideal reference waveform) and values of a corresponding ideal reference waveform. Also, in some embodiments, the waveform synthesis circuit may selectively activate or deactivate the waveform correction for some generated values based at least in part on the differences the generated values and corresponding values of the ideal reference waveform. For example, when the difference is acceptable small, the waveform synthesis circuit may deactivate the waveform correction for this value and take it as an acceptable imitation of its corresponding value on the ideal reference waveform.

In some embodiments, the waveform synthesis circuit may provide the corrected values of the reference waveforms, e.g., to a signal transmission circuit of the signal transmitter, for generating signal to be transmitted (block 925).

Figure 10:
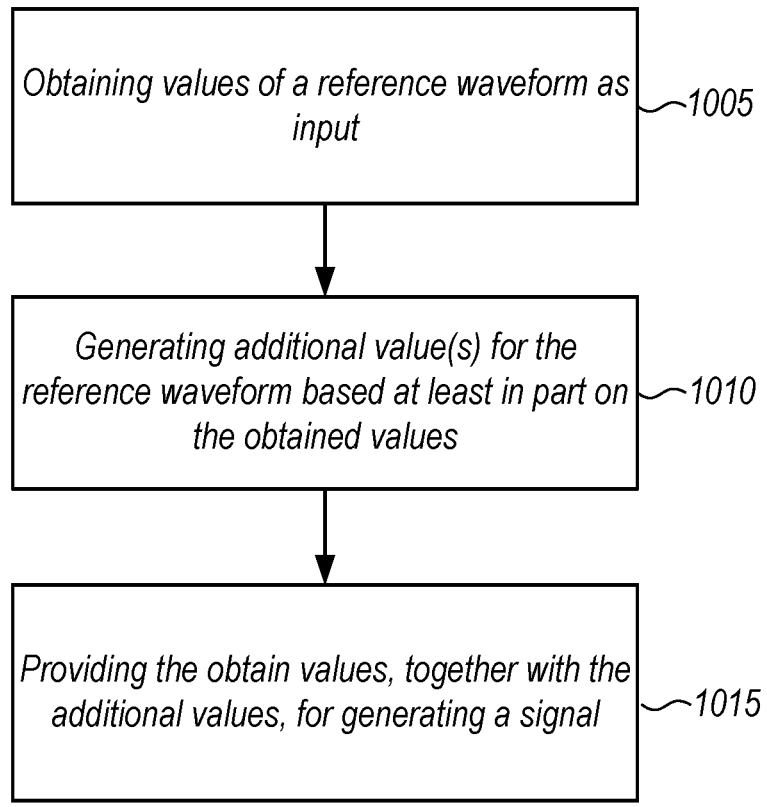
FIG. 10 is a flowchart illustrating example operations of a sampling boost circuit of a signal transmitter, according to some embodiments.

FIG. 10 is a flowchart illustrating example operations of a sampling boost circuit of a signal transmitter, according to some embodiments. As shown in FIG. 10, in some embodiments, the sampling boost circuit (e.g., the sampling boost circuit described above in FIG. 7) may obtain values of a reference waveform, e.g., from a waveform synthesis circuit of the signal transmitter, as input (block 1005). As described above, the values may be values stored in a storage circuit of the signal transmitter or values generated, e.g., by a waveform synthesis circuit, during operation of the signal transmitter.

In some embodiments, the sampling boost circuit may generate one or more additional values for the reference waveform based at least in part on the obtained values of the reference waveform (block 1010). For example, as described above with regards to equations (4)-(5), the additional values may be generated using interpolation of the obtained reference values.

In some embodiments, the sampling boost circuit may provide the originally obtained values, together with the additional values generated by the sampling boost circuit, for generating a signal to be transmitted by the signal transmitter (block 1015). As described above, since more values are provided, this virtually increases the resolution and sampling rate of the reference waveform.

Figure 11:
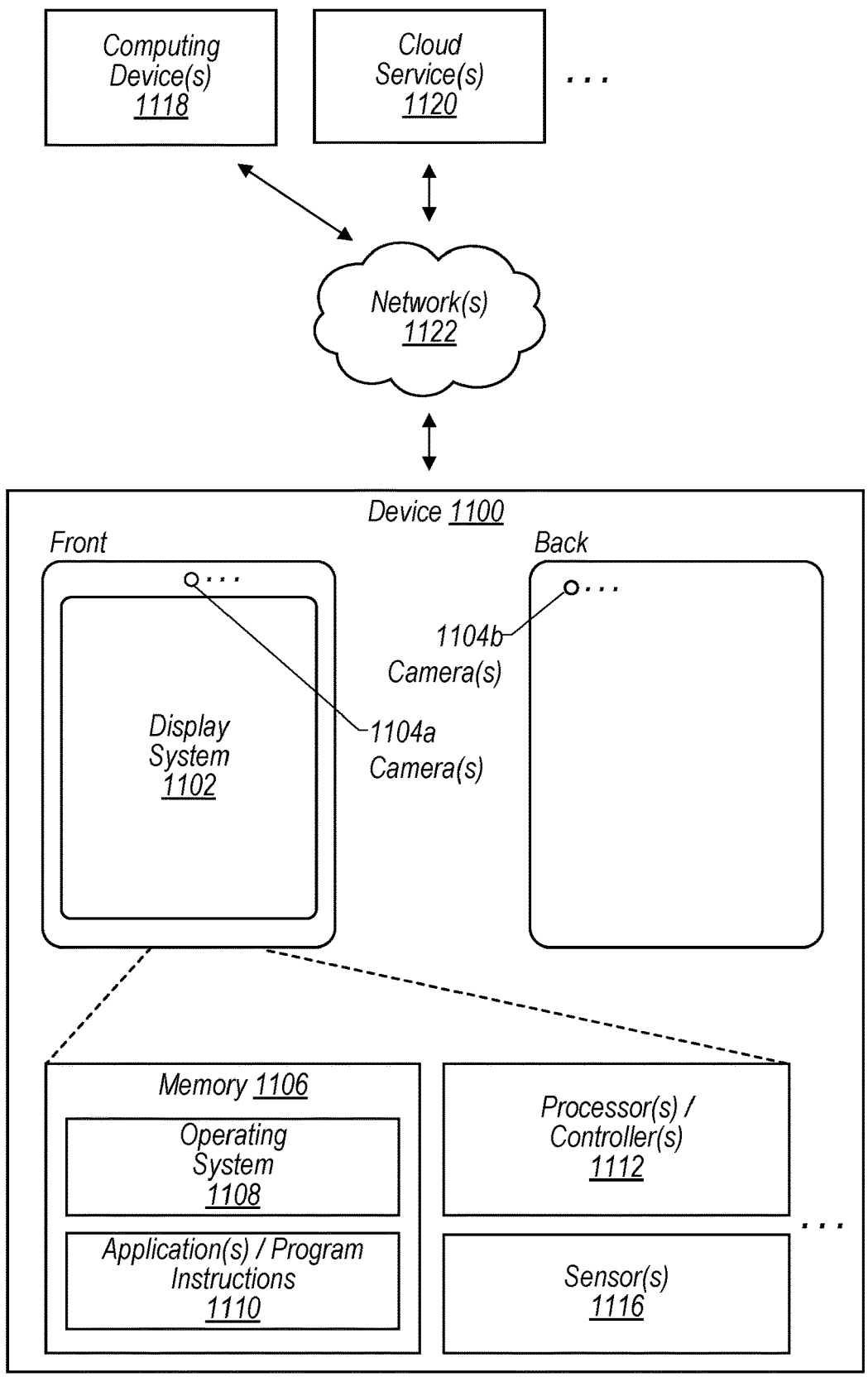
FIG. 11 illustrates a schematic representation of an example device that may include a signal transmitter, according to some embodiments.

FIG. 11 illustrates a schematic representation of an example device 1100 that may include a signal transmitter (e.g., the signal transmitter described above in FIGS. 1-10), according to some embodiments. In some embodiments, the device 1100 may be a mobile device and/or a multifunction device. In various embodiments, the device 1100 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1100 may include a display system 1102 (e.g., comprising a display and/or a touch-sensitive surface) and/or one or more cameras 1104. In some non-limiting embodiments, the display system 1102 and/or one or more front-facing cameras 1104a may be provided at a front side of the device 1100, e.g., as indicated in FIG. 11. Additionally, or alternatively, one or more rear-facing cameras 1104b may be provided at a rear side of the device 1100. In some embodiments comprising multiple cameras 1104, some or all of the cameras may be the same as, or similar to, each other. Additionally, or alternatively, some or all of the cameras may be different from each other. In various embodiments, the location(s) and/or arrangement(s) of the camera(s) 1104 may be different than those indicated in FIG. 11.

Among other things, the device 1100 may include memory 1106 (e.g., comprising an operating system 1108 and/or application(s)/program instructions 1110), one or more processors and/or controllers 1112 (e.g., comprising CPU(s), memory controller(s), display controller(s), and/or camera controller(s), etc.), and/or one or more sensors 1116 (e.g., orientation sensor(s), proximity sensor(s), and/or position sensor(s), etc.). In some embodiments, the device 1100 may communicate with one or more other devices and/or services, such as computing device(s) 1118, cloud service(s) 1120, etc., via one or more networks 1122. For example, the device 1100 may include a network interface (e.g., network interface yy10) that enables the device 1100 to transmit data to, and receive data from, the network(s) 1122. Additionally, or alternatively, the device 1100 may be capable of communicating with other devices via wireless communication using any of a variety of communications standards, protocols, and/or technologies.

Figure 12:
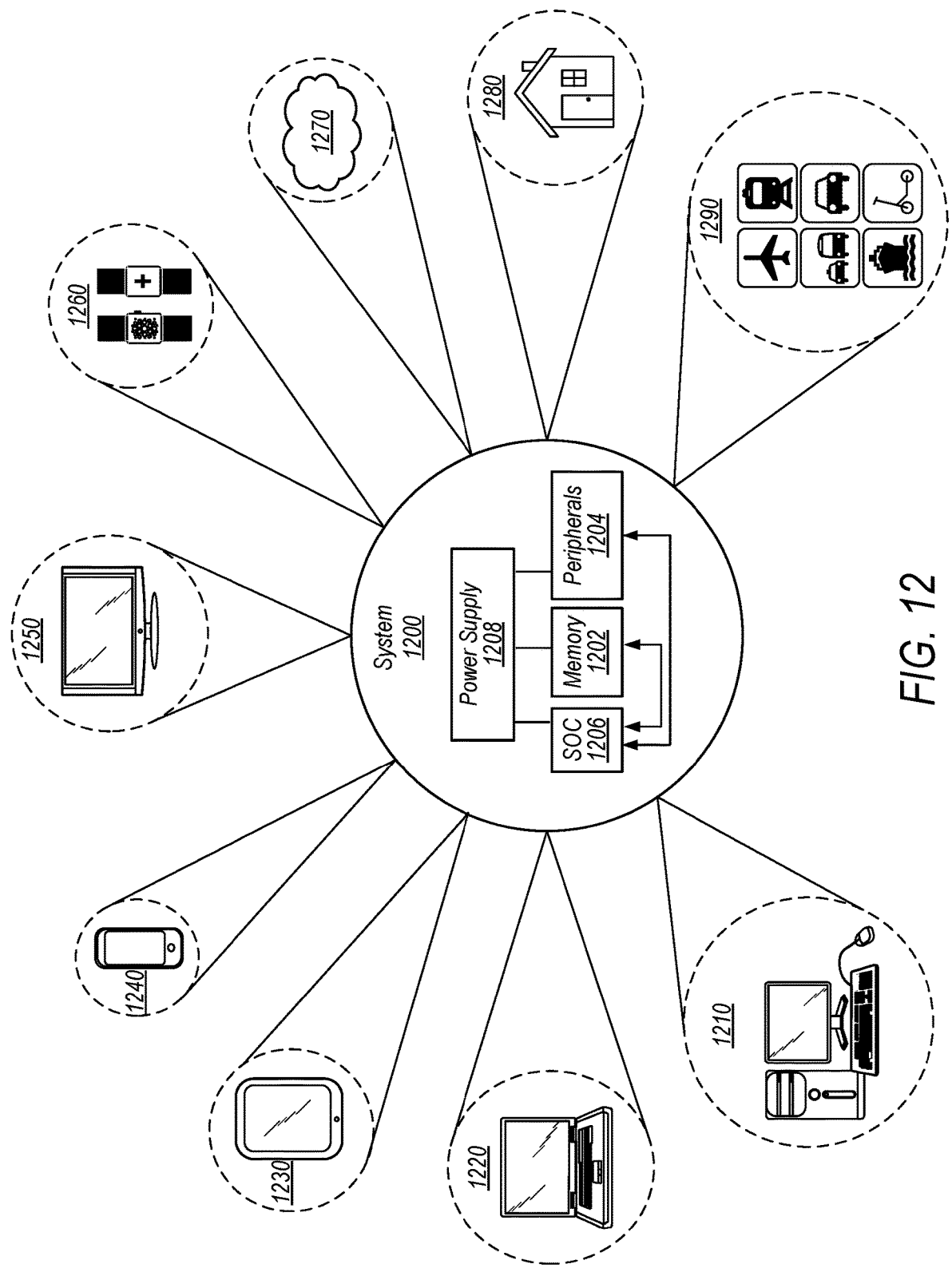
FIG. 12 shows a block diagram of an example system on a chip (SOC) that includes a signal transmitter, according to some embodiments.

In some embodiments, a signal transmitter may be integrated as part of a system on a chip (SOC). FIG. 12 shows a block diagram of an example SOC that includes a signal transmitter (e.g., the signal transmitter described above in FIGS. 1-11), according to some embodiments. In FIG. 12, the system 1200 includes at least one instance of a system on a chip (SOC) 1206 coupled to one or more peripherals 1204 and an external memory 1202. A power supply (PMU) 1208 is provided which supplies the supply voltages to the SOC 1206 as well as one or more supply voltages to the memory 1202 and/or the peripherals 154. In some embodiments, more than one instance of the SOC 1206 may be included (and more than one memory 1202 may be included as well).

The peripherals 1204 may include any desired circuitry, depending on the type of system 1200. For example, in one embodiment, the system 1200 may be a mobile device (e.g., personal digital assistant (PDA), smart phone, etc.) and the peripherals 1204 may include devices for various types of wireless communication, such as Wi-Fi, Bluetooth, cellular, global positioning system, etc. The peripherals 1204 may also include additional storage, including RAM storage, solid state storage, or disk storage. The peripherals 1204 may include user interface devices such as a display screen, including touch display screens or multitouch display screens, keyboard or other input devices, microphones, speakers, etc. In other embodiments, the system 1200 may be any type of computing system (e.g., desktop personal computer, laptop, workstation, net top etc.).

The external memory 1202 may include any type of memory. For example, the external memory 1202 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 1202 may include one or more memory modules to which the memory devices are mounted, such as single inline memory modules (SIMMs), dual inline memory modules (DIMMs), etc. Alternatively, the external memory 1202 may include one or more memory devices that are mounted on the SOC 1206 in a chip-on-chip or package-on-package implementation.

As illustrated, system 1200 is shown to have application in a wide range of areas. For example, system 1200 may be utilized as part of the chips, circuitry, components, etc., of a desktop computer 1210, laptop computer 1220, tablet computer 1230, cellular or mobile phone 1240, or television 1250 (or set-top box coupled to a television). Also illustrated is a smartwatch and health monitoring device 1260. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1200 may further be used as part of a cloud-based service(s) 1270. For example, the previously mentioned devices, and/or other devices, may access computing resources in the cloud (i.e., remotely located hardware and/or software resources). Still further, system 1200 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 12 is the application of system 1200 to various modes of transportation. For example, system 1200 may be used in the control and/or entertainment systems of aircraft, trains, buses, cars for hire, private automobiles, waterborne vessels from private boats to cruise liners, scooters (for rent or owned), and so on. In various cases, system 1200 may be used to provide automated guidance (e.g., self-driving vehicles), general systems control, and otherwise. These any many other embodiments are possible and are contemplated. It is noted that the devices and applications illustrated in FIG. 12 are illustrative only and are not intended to be limiting. Other devices are possible and are contemplated.

Figure 13:
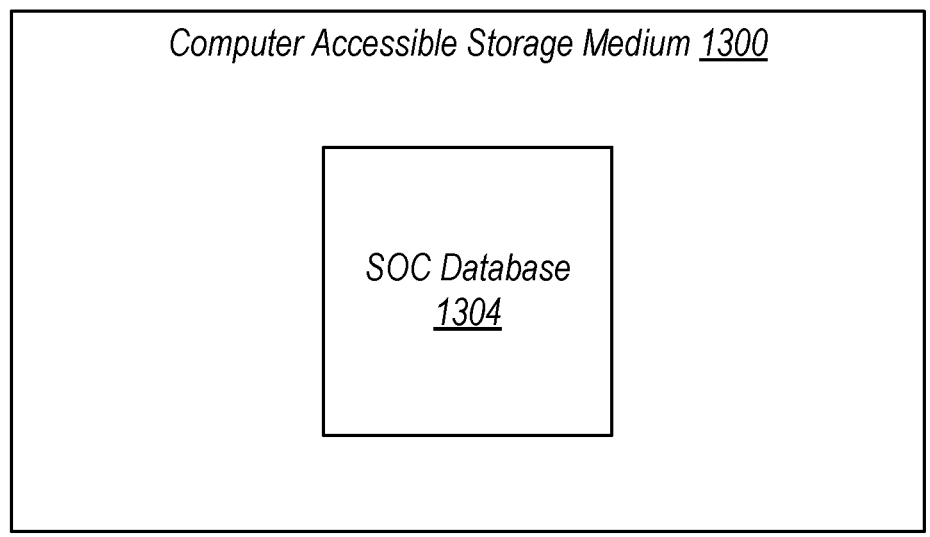
FIG. 13 shows an example computer readable storage medium that stores a database for implementing a system on a chip (SOC) that includes a signal transmitter, according to some embodiment.

FIG. 13 shows an example computer readable storage medium that stores a database for implementing a system on a chip (SOC) that includes a signal transmitter (e.g., the signal transmitter as described above in FIGS. 1-12), according to some embodiments. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 1300 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 1300 in FIG. 13 may store a database 1304 representative of the SOC 1206 including the signal transmitter. Generally, the database 1304 may be a database which can be read by a program and used, directly or indirectly, to fabricate the hardware comprising the SOC 1206. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 1206. The netlist may then be placed and routed to produce a data set describing geometric shapes to be applied to masks. The masks may then be used in various semiconductor fabrication steps to produce a semiconductor circuit or circuits corresponding to the SOC 1206. Alternatively, the database 1304 on the computer accessible storage medium 1300 may be the netlist (with or without the synthesis library) or the data set, as desired.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-

[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended oi to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A system, comprising:
a waveform synthesis circuit, comprising:
a storage circuit configured to:
store a plurality of values of a source waveform; and
store one or more correction values representing differences between a waveform generated according to the plurality of values of the source waveform and a reference waveform of the generated waveform;
a waveform generation circuit configured to generate a plurality of values of the waveform according to the plurality of values of the source waveform; and
a waveform correction circuit configured to correct at least some of the plurality of values of the generated waveform using the one or more correction values to generate a corrected waveform; and
a signal transmission circuit configured to transmit a signal generated at least in part on the corrected waveform.

2. The system of claim 1, wherein the waveform correction circuit comprises a correction activation circuit configured to activate correcting the at least some of the plurality of values based at least in part on the differences.

3. The system of claim 1, further comprising a sampling boost circuit configured to generate one or more additional values of the source waveform based at least in part on the values of the generated waveform provided by the waveform generation circuit.

4. The system of claim 3, wherein the sampling boost circuit is further configured to linearly interpolate a portion of the plurality of values of the source waveform to generate the one or more additional values of the source waveform such that one value of the one or more additional values is generated using linear interpolation of two values of the plurality of values of the source waveform.

5. The system of claim 1, wherein the corrected waveform is generated for transmission on a first channel;
wherein the one or more correction values are stored for the first channel;
wherein the storage circuit is further configured to store a second one or more correction values representing second differences between a second waveform generated for a second channel according to the plurality of values of the source waveform and a second reference waveform of the generated waveform;
wherein the waveform generation circuit is further configured to generate a second plurality of values of the second waveform according to the plurality of values of the source waveform;
wherein the waveform correction circuit is further configured to correct at least some of the second plurality of values of the generated second waveform using the second one or more correction values to generate a second corrected waveform; and
wherein the signal transmission circuit is further configured to transmit, on the second channel, a second signal generated at least in part on the second corrected waveform.

6. The system of claim 1, wherein the source waveform and the reference waveform are individually in a shape of a sine cardinal (sinc) pulse.

7. The system of claim 1, wherein the transmitted signal is an ultra-wideband (UWB) wireless signal.

8. A method, comprising:
storing, by a storage circuit, a plurality of values of a source waveform and one or more correction values representing differences between a waveform generated according to the plurality of values of the source waveform and a reference waveform of the generated waveform;
generating, by a waveform generation circuit, a plurality of values of the waveform according to the plurality of values of the source waveform;
correcting, by a waveform correction circuit, at least some of the plurality of values of the generated waveform using the one or more correction values to generate a corrected waveform; and
transmitting, by a signal transmission circuit, a signal generated at least in part on the corrected waveform.

9. The method of claim 8, further comprising activating, by a correction activation circuit of the waveform correction circuit, correcting the at least some of the plurality of values based at least in part on the differences.

10. The method of claim 8, further comprising generating, by a sampling boost circuit, one or more additional values of the source waveform based at least in part on the values of the generated waveform provided by the waveform generation circuit.

11. The method of claim 10, wherein generating the one or more additional values of the source waveform comprises linearly interpolating a portion of the plurality of values of the source waveform to produce the generated waveform such that one value of the generated waveform is generated using linear interpolation of two values of the source waveform.

12. The method of claim 8, wherein the corrected waveform is generated for transmission on a first channel, wherein the one or more correction values are stored for the first channel, and wherein the method further comprises:
storing, by the storage circuit, a second one or more correction values representing second differences between a second waveform generated for a second channel according to the plurality of values of the source waveform and a second reference waveform of the generated waveform;
generating, by the waveform generation circuit, a second plurality of values of the second waveform according to the plurality of values of the source waveform;
correcting, by the waveform correction circuit, at least some of the second plurality of values of the generated second waveform using the second one or more correction values to generate a second corrected waveform; and
transmitting, by the signal transmission circuit on the second channel, a second signal generated at least in part on the second corrected waveform.

13. The method of claim 8, wherein the source waveform and the reference waveform are individually in a shape of a sine cardinal (sinc) pulse.

14. The method of claim 8, wherein the transmitted signal is an ultra-wideband (UWB) wireless signal.

15. A signal transmitting device, comprising:
a storage circuit configured to store a plurality of values of a source waveform;
a waveform generation circuit configured to generate a plurality of values of a waveform according to the plurality of values of the source waveform;
a sampling boost circuit configured to generate one or more additional values of the source waveform based at least in part on the values of the generated waveform provided by the waveform generation circuit; and a signal transmission circuit configured to transmit a signal generated at least in part on a corrected waveform, the corrected waveform based at least on part on the generated waveform.

16. The signal transmitting device of claim 15, wherein the sampling boost circuit is further configured to linearly interpolate a portion of the plurality of values of the source waveform to generate the one or more additional values of the source waveform such that one value of the one or more additional values is generated using linear interpolation of two values of the plurality of values of the source waveform.

17. The signal transmitting device of claim 15, wherein the storage circuit is further configured to store one or more correction values representing differences between the waveform generated according to the plurality of values of the source waveform and a reference waveform of the generated waveform, and wherein the signal transmitting device further comprises a waveform correction circuit configured to correct at least some of the plurality of values of the generated waveform using the one or more correction values to generate the corrected waveform.

18. The signal transmitting device of claim 17, wherein the waveform correction circuit comprises a correction activation circuit configured to activate correcting the at least some of the plurality of values based at least in part on the differences.

19. The signal transmitting device of claim 17, wherein the source waveform and the reference waveform are individually in a shape of a sine cardinal (sinc) pulse.

20. The signal transmitting device of claim 15, wherein the transmitted signal is an ultra-wideband (UWB) wireless signal.

* * * * *